Feb. 5, 1957 D. L. WOOD 2,780,129
REFLEX SIGHT OR VIEW FINDER HAVING FLUORESCENT RETICLE MARKS
Filed Jan. 29, 1954
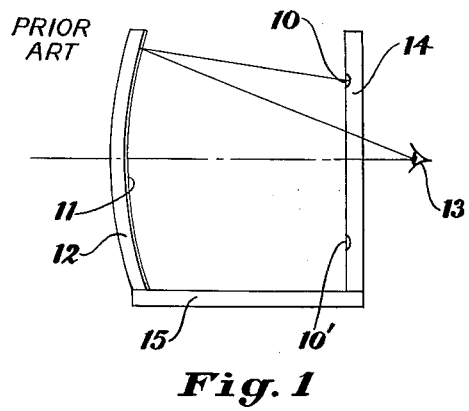
Fig. 1
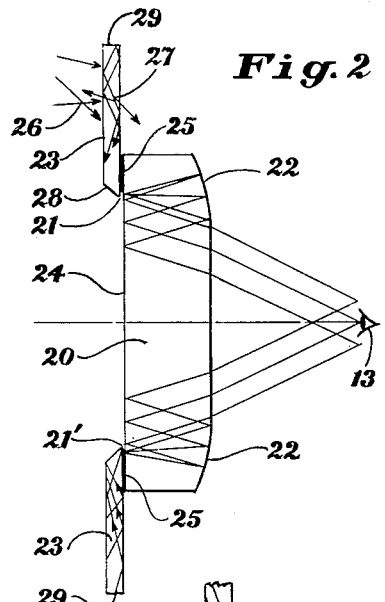
Fig. 2
Fig. 3
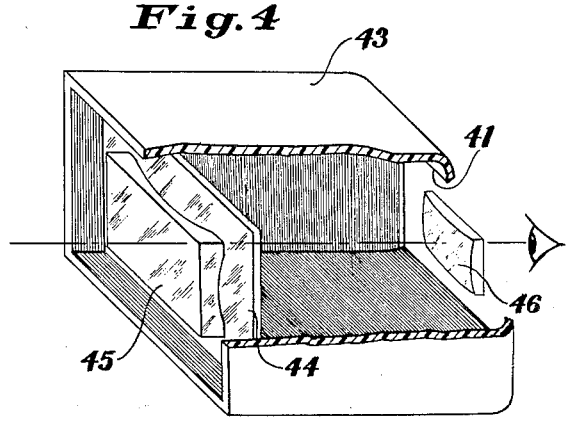
Fig. 4
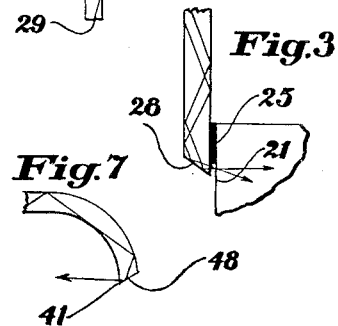
Fig. 7
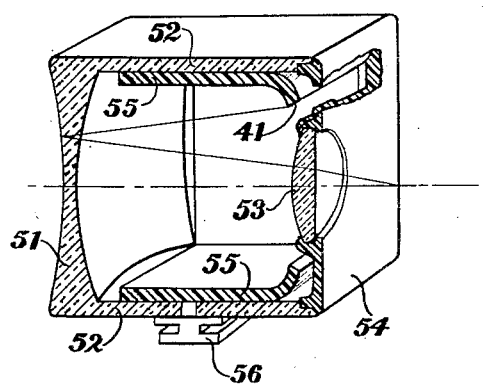
Fig. 5
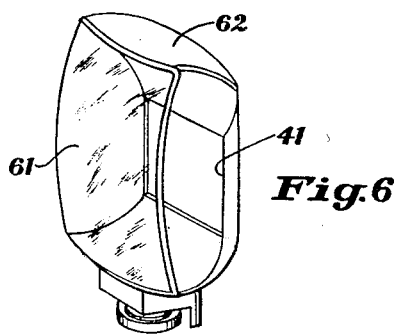
Fig. 6
Donald L. Wood
INVENTOR.
BY
ATTORNEY & AGENT

2,780,129

REFLEX SIGHT OR VIEW FINDER HAVING FLUORESCENT RETICLE MARKS

Donald L. Wood, Rochester, N. Y., assignor to Eastman Kodak Company, Rochester, N. Y., a corporation of New Jersey Application January 29, 1954, Serial No. 406,950

3 Claims. (Cl. 88—1.5)

This invention relates to reflex sights and particularly to reflex sights which are adapted to be used as view finders on cameras and which have a rectangular reticle mark outlining the area covered by the camera which is made to appear substantially at infinity by reflection from the rear face of a semi-reflecting surface through which the distant scene is viewed.

The object of the invention is to provide a reflex sight or view finder in which the frame marks or reticle marks stand out clearly and brightly against the object field and with strong color contrast in the case of most ordinary scenes.

Reflex sights have been known for a number of years and their method of operation is easily described. An object scene, usually distant, is viewed through a semitransparent mirror, and light from a reticle or fiducial mark of some shape suitable to the purpose at hand is reflected from the semi-transparent mirror so that it is substantially collimated when it reaches the eye. A number of different arrangements of mirrors and of lenses associated therewith have been suggested for use in these reflex sights such as a 45-degree plane mirror onto which collimated light from the reticle mark is thrown through some kind of an optical system.

One of the most useful types of reflex sights, for use as a view finder, is sometimes known as the Albada type and comprises a reticle mark, usually rectangular in outline, surrounding a peephole or eyelens through which the distant scene is viewed, and, at a suitable distance in front of this peephole, a curved semi-transparent mirror concave toward the peephole or eyelens. For projecting the frame to infinity, the mirror is located at a distance equal to one-half its radius of curvature from the apparent plane of the reticle. If the scene is to be viewed magnified or diminished in size, a positive or negative lens is provided at the mirror position and a lens of the opposite sign at the peephole position in the manner well known in Galilean telescopes, in which case one of the surfaces of the lens usually, but not necessarily, serves as the mirror surface and its curvature is computed according to the well known rules of Gaussian optics so that the light from the reticle mark is collimated after it passes through the eyelens to the eye.

While this type of reflex finder was found to have great advantages, it was also found difficult to illuminate the reticle marks sufficiently to make them stand out clearly against all kinds of scenes, and many schemes have been proposed for improving the visibility of the reticle marks. None of these schemes, however, has been entirely successful and this type of view finder has not been as widely adopted as at first appeared probable.

According to the present invention, a reflex sight is made up in which the reticle marks are formed or illuminated by the edge of a sheet or body of fluorescent transparent material shaped and positioned so that a substantial area of it is exposed to light from the surrounding scene or from some source of illumination provided for the purpose. Light is radiated in all directions by the fluorescent particles within the transparent sheet, and a large portion of it is trapped by total internal reflection and is carried along by repeated reflections until it comes to an edge or other surface irregularity where it strikes at less than the critical angle of internal reflection and emerges. This causes that edge or irregularity to glow brightly. Thus, by using an edge of the sheet or some other irregularity to form the reticle mark a brightly glowing reticle mark is provided. Alternative, the glowing edge is positioned behind a transparent reticle mark in an opaque surface. A virtual image of the reticle is then projected upon the field of view in the usual way by an optical system which includes a semi-reflecting mirror. This mirror may be lightly silvered as in the prior art but is preferably a dichroic interference layer reflector which is highly reflecting to light of the wave lengths emitted by the fluorescing medium and highly transparent to other wave lengths. Preferably, the fluorescent material emits light of a color of nonmaximum visibility such as reddish-orange which also contrasts strongly with green foliage and other common objects. A dichroic interference layer reflector which is particularly suitable for use in reflex sights according to the invention is described in a copending application, Serial No. 406,967 filed concurrently herewith by Paul B. Mauer.

According to a preferred form of the invention, the fluorescent transparent sheet material forms the sides and top and bottom of the body of the reflex finder to which the semi-transparent mirror is attached at the front. The sheet material is curved inward at the back from all four sides so that the four inward pointing edges form the outlines of a rectangular reticle mark emitting light toward the mirror. The semi-reflecting mirror may be attached directly to the fluorescent sheet material or it may be attached to a transparent casing which surrounds the fluorescent material. Numerous variations of this form of the invention will suggest themselves, some of which will be described in connection with the accompanying drawings, in which:

Fig. 1 shows a reflex finder according to the prior art and some of the principles involved.

Fig. 2 is a diagrammatic showing of the invention embodied in a reflex sight in which the reticle marks are at the front.

Fig. 3 is a detail of Fig. 2.

Fig. 4 shows in perspective and partly cut away a form of the invention in which the finder includes a telescope system.

Fig. 5 shows in axial section and perspective a variation of the finder shown in Fig. 4.

Fig. 6 shows in perspective a finder in which the fluorescent material forms the body of the finder.

Fig. 7 is a detail of Fig. 6.

Fig. 1 shows in diagrammatic axial section a simple form of reflex sight according to the prior art and illustrates the principles involved. Light which may be considered as originating from a reticle mark or frame mark 10, 10', strikes the semi-transparent and semi-reflecting back surface 11 of a curved transparent sheet 12 and the rays are then reflected to the eye position 13 behind the sight. The reflecting surface 11 of window 12 is given a suitable curvature so that the frame marks 10, 10' appear to be substantially at infinity. This curature is easily computed by elementary optical formulas. Known variations in these sights relates to the manner of silvering or otherwise rendering the surface 11 reflecting and to the dioptric power which is given to the window 11 and balanced by the eyelens not shown in Fig. 1 and other variations relate to the manner of illuminating the frame line and making it stand out in contrast to the background.

Various methods of forming the reticle marks have been proposed. In Fig. 1 the sight is provided with a rear window 14 which is held at a fixed distance from the front window 11 by means of a base 15. The reticle or frame marks 10, 10' are marked on the window 14, for example, by painting a black line or by engraving a groove and filling it with white pigment. Fluorescent pigment has also been suggested for use in this form of sight, but experiment has shown that it has little or no advantage over white pigment when used with a lightly silvered front mirror 11.

The present invention has nothing to do with the dioptric power to be given to the front window 11 and the rear window 14, as these may be given zero power or may be made up to form a Galilean telescope or a reversed Galilean telescope as in the prior art according to the magnification of the field of view which is desired. Likewise, the present invention is not primarily concerned with the position or size of the reticle marks or frame marks nor with the manner of rendering the front window reflecting, although it is preferred to give the front window a dichroic interference reflection coating which will reflect most strongly the color given out by the frame marks according to the invention and transmit most completely the wave lengths to which the eye is most sensitive, and particularly to use an interference coating of the type described in the above-mentioned copending application by Paul Mauer.

Fig. 2 shows in diagrammatic axial section the invention embodied in the type of reflex finder in which the frame lines are at the front and the light therefrom is reflected twice before reaching the eyepoint. The body of the finder in this case is a block of transparent material 20 which is flat on the front and over the central portion of the back. Around the borders of the back are cylindrical portions 22 which are fully silvered and which receive light from frame lines located at the inward edges 21, 21' of the sheet 23 which will be described presently. Light from these frame lines is reflected from the cylindrical silvered areas 22, 22' and collimated in the plane of the diagram. (Since it is a line image, collimation in the perpendicular plane is not important.) It is then reflected from the plane front surface 24 which is coated to render it semi-reflecting and semi-transparent. The rays from the frame mark are thus combined with the rays from the object field and proceed through the rear surface to the eyepoint 13, so that the frame mark appears superimposed upon the object field.

A sheet of fluorescent transparent plastic 23 mentioned above is provided into which is cut a rectangular opening outlined by the inward edges 21, 21'. This is centered against the front face of the body of the finder to form the frame marks.

Light 26 from the surroundings is incident upon the sheet 23 and strikes fluorescent particles 27 embedded therein, only one such particle being shown in the figure. These particles fluoresce, emitting light in all directions. Some of the fluorescent light emerges through the surfaces of the sheet but most of it strikes the surfaces at steeper than the critical angle of internal reflection (about 40°) and is trapped inside the transparent sheet until it strikes an edge and emerges. The edge face 28 is cut on a bias of roughly 30° to 35° as shown in more detail in Fig. 3 to throw light toward the silvered area 22. It may be flat or slightly convex. The outward edge 29 of the fluorescent sheet is optionally silvered or whitened to reflect light which would otherwise escape. Optionally, an opaque shield 25 separates the fluorescent sheet from the body of the finder, leaving only a narrow edge 21 exposed. In the prior art, the frame lines were formed by transparent lines in this opaque shield. The fluorescent plastic is found to illuminate the marks much more brilliantly than the direct light from the surroundings, and the edge 21 defines one side of the mark sharply making unnecessary the ruling of a line in the opaque shield.

Transparent fluorescent plastic is well known and available in a variety of colors and is widely used in making up house numbers and signs in store windows.

Fig. 4 shows in perspective another form of the invention in which the frame lines are at the back as in the type of prior art shown in Fig. 1. The top, bottom and sides are formed of a sheet of fluorescent plastic 43 turned inward at the back so that its edge 41 forms the rectangular frame line. Experiment has shown that the edge should be turned in about 90°, as shown in more detail in Fig. 7, and the inward edge 48 of the sheet cut on a bias of about 30° to throw the fluorescent light forward, very similarly to the way the previous example operates in this respect. This was found to be more efficient than turning the edge 180° and using the edge face flat on as a frame mark.

The fluorescent sheet is cut away in Fig. 4 to show the semi-transparent reflector 44 supported by the fluorescent sheet, the negative field lens 45 supported by the reflector, and the positive eye lens 46. The two lenses form a conventional reversed Galilean telescope for reducing the apparent size of the field. The distance from the frame mark 41 to the reflector 44 and thence to the eye lens 46 is approximately equal to the focal length of the eye lens so that the frame marks appear approximately at infinity when viewed through the eye lens 46. The eye lens 46 is supported in any convenient way (not shown) so long as the support does not make optical contact with much area of the fluorescent sheet and thereby rob the frame lines of some of the light.

Fig. 5 shows a reflex sight in axial section and partly in perspective. The front lens 51 in this case is molded integral with transparent side walls 52, and the eye lens 53 is mounted in a back cover plate 54 which is attached to the rear edge of the side walls 52. The body of sheet fluorescent material 55 is slid inside the side walls 52 of the sight or finder before the back plate 54 is assembled. The shape and operation of the fluorescent material is generally the same as in Fig. 4 but in this case it is removable and another piece giving different size frame lines can be substituted, for example, when a lens of a different focal length is substituted on the camera with which the finder is used. A conventional mounting button or lug 56 is provided in the usual way for mounting the finder on a camera. The shape of the lens 51 is chosen so that one surface has the proper curvature to make the frame mark appear at infinity, and this surface is given a semi-reflecting coating.

Fig. 6 is a perspective drawing of another form of the invention which has been made up and has proven very successful. This is a very simple camera finder in which no magnification of the field of view is required, otherwise it is in principle the same as Fig. 4. The front window 61 is curved as in Fig. 1 and is formed of transparent material with a semi-reflecting coating on the back face. The body 62 of the finder is made up of transparent fluorescent plastic and is curved at the back edges so that the fluorescent light emitted within the plastic is conducted around each curved edge of the body of the finder to the edge 41 of the rear window where it forms a brightly illuminated frame mark. The edge 53 forms the boundary of a rectangular opening in the rear of the finder body through which the observer looks to see the reflection of the frame mark 63 in the front window 61. A conventional mounting lug 56 is provided in the usual way.

Fig. 7 is a detail of Fig. 4, 5 or 6 showing the wall of the finder body in diagrammatic axial section from the upper edge down to the frame line 41, and has been described in connection with Fig. 4.

It will be seen from these few examples that sights or finders according to the invention can be made up in a great many forms and of course they can be combined with known devices for focusing and for changing the angular field bounded by the projected image of the frame lines and for correcting the parallax between the finder and the main objective of the camera. However, these details are not essential to the invention and will not be described here.

In all of the examples shown and in all finders according to the invention as now contemplated, the frame marks or reticle marks are illuminated by fluorescent light from an edge of a body of substantially transparent fluorescent material. This material is usually illuminated by light from the surrounding scene to cause the fluorescence but under certain circumstances may be illuminated by a light source provided especially for that purpose. In a preferred form of the invention, light from these frame marks or reticle marks is reflected from a dichroic interference reflecting surface having such a curvature that the image of the reticle marks appears at substantially the same distance as the scene being viewed.

I claim:

1. A reflex sight comprising a body of fluorescent and at least partially transparent material in sheet form adapted to receive light from the surroundings through a substantial area of the surface of said sheet, to generate fluorescent light within itself and to conduct a large portion of said fluorescent light by internal reflections to an edge of said body and to emit said large portion of light from said edge, and a transparent member having a partially reflecting and partially transmitting coating on one surface for combining rays of light from said edge of said fluorescent body with rays of light from an object scene and curved for giving the two sets of rays equal vergency, whereby an image of said edge of said fluorescent body appears superimposed upon said object scene at substantially the same distance, in which the said partially reflecting coating is a dichroic interference coating having a reflection maximum in the wavelength range emitted by the fluorescent material.

2. A reflex finder for use with cameras and the like comprising a sheet of fluorescent transparent material adapted to receive light from its surroundings through a substantial area of the surface of said sheet and to emit fluorescent light from an edge of said sheet, said edge being arranged to outline a rectangular area, and an optical member provided with a semi-transparent reflecting surface for combining rays of light from said edge of said fluorescent sheet with rays of light from an object field and rendering them of equal vergency whereby an image of the edge of the fluorescent sheet is made to appear superimposed upon the object field, in which the said partly reflecting coating is a dichroic interference coating strongly reflecting the dominant wavelength of the fluorescent light and transmitting other visible wavelengths.

3. A reflex finder for use with cameras and the like comprising a body of generally rectangular cross-section adapted and arranged to receive light from the surroundings through a substantial area of its surface and composed of a sheet of transparent fluorescent material with its rear edge turned inwardly in a smooth substantially 90° curve to form the outline of a rectangular area, and an optical member mounted at the front end of said body and provided with a semi-transparent reflecting surface for combining rays of light from said rear edge of said fluorescent body with rays of light from an object field viewed through said finder and for giving the two sets of rays equal vergency whereby an image of the said edge is made to appear superimposed upon said object field, in which the said semi-transparent reflecting surface is a dichroic interference coating having a reflection maximum substantially at the dominant wavelength of the fluorescent light whereby the image of the said edge appears bright and the apparent brightness of the object field is only slightly decreased.

References Cited in the file of this patent

UNITED STATES PATENTS

| | | |
|---|---|---|
| 2,187,057 | Sauer | Jan. 16, 1940 |
| 2,278,505 | Zapp | Apr. 7, 1942 |
| 2,392,979 | Douden | Jan. 15, 1946 |
| 2,517,779 | Flint | Aug. 8, 1950 |
| 2,633,051 | Davis | Mar. 31, 1953 |